United States Patent
Aliberti (10) Patent No.: US 11,820,115 B1
(45) Date of Patent: Nov. 21, 2023

(54) FORM-SHAPABLE TARPAULIN MATERIAL

(71) Applicant: Christopher Aliberti, Nanticoke, PA (US)

(72) Inventor: Christopher Aliberti, Nanticoke, PA (US)

( * ) Notice: Subject to any disclaimer, the term of this patent is extended or adjusted under 35 U.S.C. 154(b) by 3 days.

(21) Appl. No.: 18/074,052

(22) Filed: Dec. 2, 2022

Related U.S. Application Data (60) Provisional application No. 63/418,383, filed on Oct. 21, 2022, provisional application No. 63/391,720, filed on Jul. 23, 2022.

(51) Int. Cl.
| | |
|---|---|
| *B32B 3/08* | (2006.01) |
| *B32B 15/02* | (2006.01) |
| *B32B 3/18* | (2006.01) |
| *B32B 15/08* | (2006.01) |
| *B32B 27/08* | (2006.01) |
| *B32B 3/26* | (2006.01) |
| *B32B 7/12* | (2006.01) |
| *B32B 15/18* | (2006.01) |
| *B32B 15/20* | (2006.01) |
| *B32B 27/20* | (2006.01) |

(52) U.S. Cl.
CPC ................ *B32B 3/08* (2013.01); *B32B 3/18* (2013.01); *B32B 3/266* (2013.01); *B32B 15/02* (2013.01); *B32B 15/08* (2013.01); *B32B 27/08* (2013.01); *B32B 7/12* (2013.01); *B32B 15/18* (2013.01); *B32B 15/20* (2013.01); *B32B 27/20* (2013.01); *B32B 2255/06* (2013.01); *B32B 2255/26* (2013.01); *B32B 2305/38* (2013.01); *B32B 2307/546* (2013.01); *B32B 2307/718* (2013.01); *B32B 2307/7265* (2013.01); *B32B 2571/00* (2013.01)

(58) Field of Classification Search
CPC .............. B32B 3/08; B32B 3/18; B32B 3/266
See application file for complete search history.

(56) References Cited

U.S. PATENT DOCUMENTS

| | | |
|---|---|---|
| 4,721,140 A | 1/1988 | Cocker |
| 5,804,799 A | 9/1998 | Stewart |
| 6,696,674 B1 | 2/2004 | Doornsbosch |
| 6,709,055 B2 | 3/2004 | Gengler |
| 6,863,100 B2 | 3/2005 | Neal et al. |
| 7,866,358 B1 | 1/2011 | Simms, II |
| 8,069,871 B2 | 12/2011 | Schneider |
| 8,156,975 B1 | 4/2012 | Pickering |
| 2002/0076521 A1 | 6/2002 | Doppelt |
| 2003/0196562 A1 | 10/2003 | Trickett |

(Continued)

*Primary Examiner* — Jason L Vaughan
*Assistant Examiner* — Amanda Kreiling
(74) *Attorney, Agent, or Firm* — Invention To Patent Services; Alex Hobson (57) ABSTRACT

A form-shapable tarpaulin material incorporates a malleable component that enables the form-shapable tarpaulin material to be shaped into a formed shape and retain this shape. The malleable component may be coupled to a first side layer which may be a plastic layer that is waterproof. The malleable component may be continuous or discontinuous, such as including strands that form a screen or net. The malleable component may be configured between a first side layer and a second side layer, or sandwiched between these two layers. A form-shapable tarpaulin material may have a drape angle of no more than 25 degrees.

27 Claims, 7 Drawing Sheets

(56) References Cited

U.S. PATENT DOCUMENTS

| | | |
|---|---|---|
| 2004/0016484 A1 | 1/2004 | Muller |
| 2006/0090824 A1* | 5/2006 | Kreft .................. A47J 37/0786 150/154 |
| 2016/0107552 A1 | 4/2016 | Wakeman |
| 2021/0362642 A1 | 11/2021 | Delangis et al. |
| 2021/0370752 A1* | 12/2021 | Johnson .................... B32B 3/18 |

* cited by examiner

PRIOR ART

FORM-SHAPABLE TARPAULIN MATERIAL

CROSS REFERENCE TO RELATED APPLICATIONS

The application claims the benefit of priority to U.S. provisional patent application No. 63/391,720, filed on Jul. 23, 2022 and to U.S. provisional patent application No. 63/418,383, filed on Oct. 21, 2022; the entirety of each is hereby incorporated by reference herein.

BACKGROUND OF THE INVENTION

Field of the Invention

The invention relates to a form-shapable tarpaulin material that incorporates a malleable component that enables the form-shapable tarpaulin material to be shaped into a formed shape and retain this shape.

Background

Tarpaulins or tarps are used for covering any number of items. Routinely people use tarps to cover outdoor furniture, motorcycles, bicycles and the like. Rope or elastic cords are sometimes used to retain the tarps over the objects. Unfortunately, when the winds pick up, it can pull the tarps up off the object leaving the objects exposed to the weather. This is very frustrating and results in damage to the objects from exposure to the elements. Some tarps have grommets and again tethers, such as ropes or elastic cords can be coupled with the grommets and attached to the object. This is time consuming and again, the tethers can become loose exposing the object to the element. Tarps also can and often used to maintain privacy of the objects or sites as well as protect those from being observed due to the technical, legal, medical or any other reasons.

Tarps are supple and often retain rain in pools which can deteriorate the tarp and eventually lead to leaking of the rain water in these pools onto the object to be cover. Also, condensation on the underside of the tarp near the collected pools of water can damage objects, especially wooden objects, such as tables or chairs.

SUMMARY OF THE INVENTION

The invention is directed to a form-shapable tarpaulin material that incorporates a malleable component that enables the form-shapable tarpaulin material to be shaped into a formed shape and retain this shape. The malleable component may be coupled to a first side layer which may be plastic layer that is waterproof. The malleable component may be continuous or discontinuous, such as including strands that extend along the first side layer. In an exemplary embodiment, the malleable component is configured between a first side layer and a second side layer or sandwiched between these two layers.

An exemplary malleable component is discontinuous and has apertures therethrough. A discontinuous malleable component may comprise a plurality of strands which may extend in parallel or may be configured in a screen or netting configuration, or a woven configuration. The strands may be circular or rectangular in cross section. An exemplary malleable component may extend around the perimeter of the form-shapable tarpaulin material. An exemplary malleable component may have an open area, or percent of ration of the area of the apertures to the area of the malleable component of a least 25% or more, or 50% or more, or event 75% or more.

The areal mass (mass/area) of the malleable component may be, but not limited to, about 150 g/m$^2$ or more, about 200 g/m$^2$ or more, about 250 g/m$^2$ or more, about 300 g/m$^2$ or more, about 350 g/m$^2$ or more, about 400 g/m$^2$ or more, about 500 g/m$^2$ or more, about 600 g/m$^2$ or more and any range between and including the areal mass listed. It has been found that a malleable component made of metal is most effective when the areal mass is between 150 g/m2 and 600 g/m2 because it can be easily manually manipulated for formed into a formed shape and has enough mass to maintain the shaped form. If the metal malleable component is too light or low in areal mass, it may not effectively maintain a shape after being formed and if the metal malleable component is too heavy or high in areal mass, then it may be too difficult to manually form a shape over or around an object. The malleable component may be made of wire that is about between about 16 gauge to about 24 gauge, with a preferred between about 18 gauge to about 22 gauge. The apertures of the malleable component may have an aperture width, or cell width of about 10 mm or more, about 20 mm or more, about 30 mm or more, about 40 mm or more, about 50 mm or more, about 75 mm or more and any range between and including the aperture spacing listed. The diameter or thickness of the malleable component strands, which may be wire, may be about 3 mm or less, about 2.5 mm or less about, 2 mm or less, about 0.5 mm or more, about 0.75 mm or more, about 1 mm or more, about 1.25 mm or more, about 1.5 mm or more and any range between and including the diameter values provided. A preferred diameter of the strand is about 0.5 mm to about 2.5 mm as this diameter range for metal wire has been found to be capable of manual deformation without excess effort and holds a formed shape.

The malleable component may be a screen, such as a metal or polymeric or plastic screen begin formed by strands. An exemplary screen has cells that are a polygonal shape, such as a square, rectangular or hexagonal shape for example. A strand of the malleable component extends between two adjacent polygonal cells.

An exemplary malleable component may comprise, consist essentially of, or consists of metal, such as steel, aluminum, and the like. In an exemplary embodiment, a malleable component comprises metal, such as a metal screen that has a coating or covering that may act as an adhesive to bond to the first and/or second side layers. The coating or covering may be an adhesive that can be melted and may be a polymer or plastic. A covering may extend substantially over the entire surface of the screen, such as over at least 80% of the surface area and preferably at least 90%. An exemplary malleable component may comprise, consist essentially of, or consists of a polymeric or plastic material that is configured to be form-shapable and may include fillers such as particles, or fibers to provide stiffness such that the polymeric malleable component meets the drape test, as required herein, but is form shapable and holds a formed shape.

An exemplary malleable component may comprise, consist essentially of, or consists of plastic and may be form shapable plastic having a softening, or melting temperature of less than about 120° C., or less than about 100° C. or even less than about 80° C., wherein the plastic can be softened by the application of hot water, formed and then retains the formed shape. The closer the softening or melting temperature to that of hot tap water which is typically about 50° C.

to about 60° C., the easier it may be to form using heated water from the faucet. This type of malleable component may be well suited for cold climate areas, wherein an outdoor object is desired to be covered for the winter. The form shapable plastic may be heated with a hot water and then shaped around or over the object and then upon cooling, the form shapable plastic may harden to retain the formed shape.

An exemplary malleable component may comprise, consist essentially of or consists of plastic and may be shape memory plastic having the ability to return from a deformed state, deformed over or around an object to an original shape when induced by an external stimulus (trigger) such as temperature change. Shape memory plastics can also be triggered by an electric or magnetic field, light or solution. Shape memory plastic may be thermoplastic or thermoset plastic, a type of plastic that is covalently cross-linked. Shape memory plastics may have high recoverable strain, to enable shape forming over an object, such as about 500% or more, or even 800% or more.

An exemplary form-shapable tarpaulin material includes a sheet of material having the first side layer and the malleable component. As described herein, the malleable component may be configured between said first side layer and a second side layer. This sheet of material may be rectangular in shape having a first side, an opposing second side, a first-end side and an opposing second-end side. Anchor tabs may be configured in one or more of the sides and may be configured to anchor the form-shapable tarpaulin material by folding from the sheet of material under or around an object to be covered. In an exemplary embodiment, the anchor tabs are configured on two or more sides or on each of the four sides. A side may have two or more tabs and each anchor tab may be separated by tab gaps, or slots extending in from the outer perimeter of the sheet of material to form said anchor tab. A side or all sides may have anchor tabs configured in series, one after another along the entire side. Corner anchor tabs may be configured between the adjacent sides and provide additional anchoring options.

An exemplary form-shapable tarpaulin material includes a sheet of material having the first side layer and the malleable component. The malleable component may include or consists of metal and may be a sheet or perforated sheet, or screen or net material as described herein. A sheet of metal, such as a metal sheet, may have a thickness of about 3 mm or less, about 2.5 mm or less about, 2 mm or less, about 0.5 mm or more, about 0.75 mm or more, about 1 mm or more, about 1.25 mm or more, about 1.5 mm or more and any range between and including the diameter values provided. A sheet of material that forms the malleable component may have apertures therethrough to create open areas and these open areas be configured such that the percent open area of the surface area of the malleable component is 30% or more, about 40% or more, about 50% or more, about 60% or more, about 70% or more, about 80% or more, or about 90% or less, about 80% or less and any range between and including the percent open areas provided. The thickness and percent open area may be designed to enable the malleable component to be formed into a shape and then retain that shape as described herein. A fabric or other layer of material may be attached to, such as by bonding, to the malleable component.

In an exemplary embodiment, the malleable component is metal and has apertures forming an open area through the malleable component and a first side layer and a second side layer are bonded to each other through the apertures in the malleable component.

A malleable component may be configured on the outside surface of the form-shapable tarpaulin material and may be a metal that provides fire resistance to prevent an article covered under the form-shapable tarpaulin material from catching fire. A malleable component that includes a sheet of metal may provide a high level of fire resistance as it would prevent flame from passing therethrough.

An exemplary anchor tab may have a width of about 4 cm or more, about 6 cm or more, about 8 cm or more, about 10 cm or more and any range between and including the values provided. An exemplary anchor tab may have a depth from the outer perimeter of the form-shapable tarpaulin material of about 4 cm or more, about 6 cm or more, about 8 cm or more, about 10 cm or more, about 12 cm and any range between and including the values provided.

An exemplary form-shapable tarpaulin material may have fold portions, or portions of the sheet of material that does not have the malleable material to enable the form-shapable tarpaulin material to be folded along the fold portions. The fold portions may extend from one side to an opposing side. There may be two or more fold portions extending parallel to each other from one side to an opposing side.

An exemplary form-shapable tarpaulin material may be provided in a roll form that is uncut. Individual tarps may be cut from this roll of form-shapable tarpaulin material and these tarps may have dimensions effective for covering outdoor objects, such as tables, bicycles, motorcycles, grills, chairs and the like and may have a length and/or width that is about 0.5 m or more, about 1 m or more, about 2 m or more, about 3 m or more, about 5 m or more. Most outdoor objects will require a length and width of about 1 m or 1.5 m or more. The roll of form-shapable tarpaulin material may be any suitable length such as 100 m or more, 500 m or more, for example. The width of the roll of uncut form-shapable tarpaulin material may be that enabled by the processing equipment and may be for example, about 1 m or more, about 1.5 m or more, about 2.0 m or more and any range between and including the width values provided.

An exemplary form-shapable tarpaulin material may be a composite having one layer attached to a second layer, such as by adhesion, through lamination that may includes melt bonding, or through the use of an adhesive. A composite form-shapable tarpaulin material may have the malleable component bonded to a layer that is configured for exposure to the elements, which may be a fabric or a fabric composite laminate having a plurality of layers. This surface, exposed layer may be water repellant or water proof, whereby liquid water does not penetrate through this surface layer.

A component of the form-shapable tarpaulin material consists essentially of a material when no more than 10% of the component is other than the material listed.

The term consisting essentially of, as used herein, means that the item is at least 90% by weight the material described as consisting essentially of.

The summary of the invention is provided as a general introduction to some of the embodiments of the invention and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
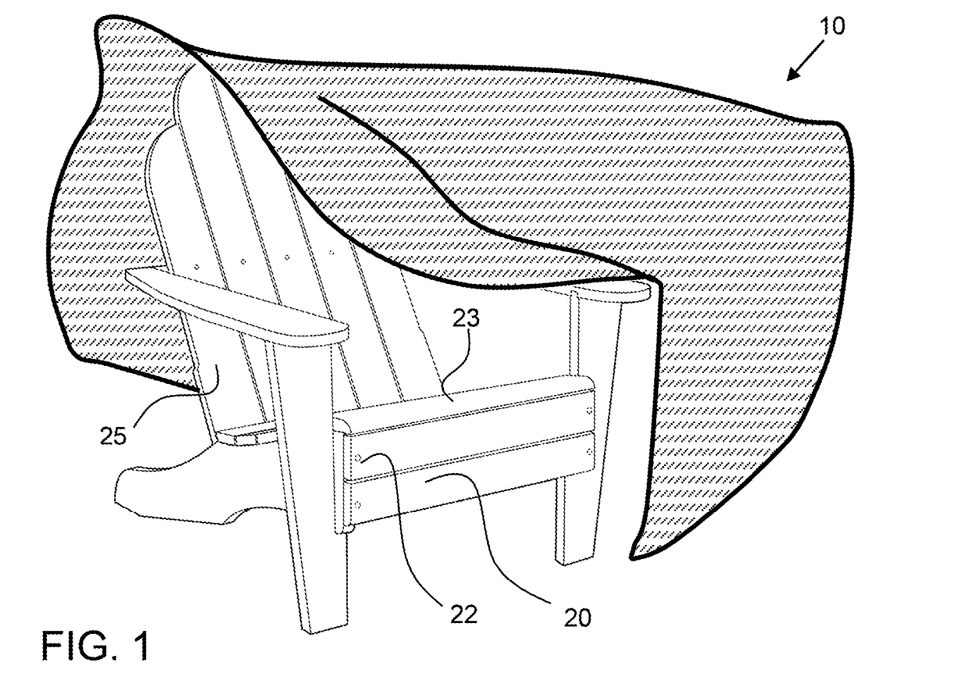
FIG. 1 shows a form-shapable tarpaulin material being formed over an object, such as a chair.
Figure 2:
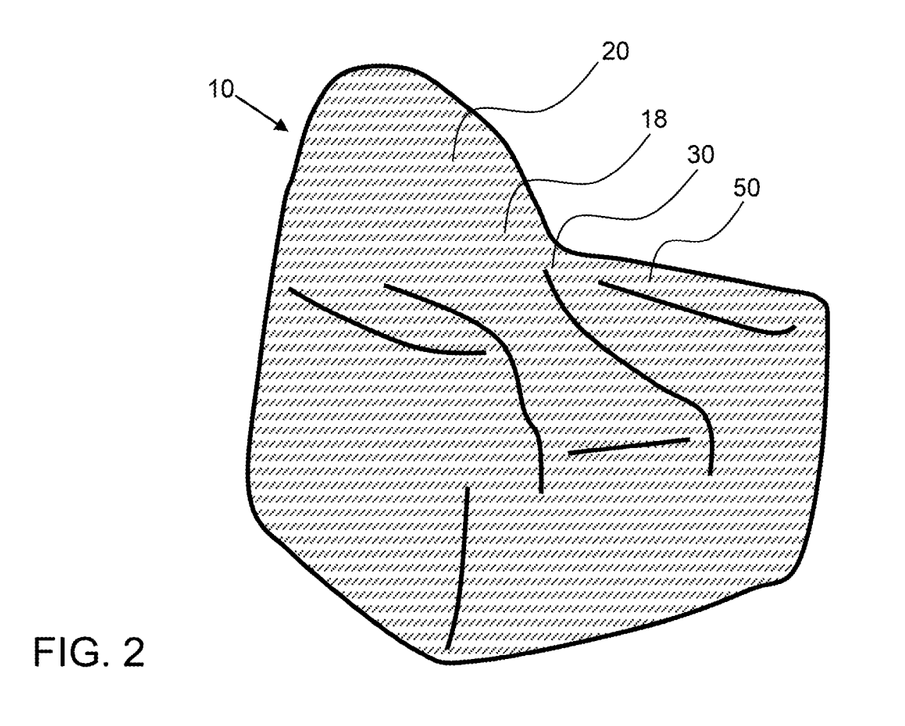
FIG. 2 shows the chair shown in FIG. 1, now covered by the form-shapable tarpaulin material being formed into a formed shape over the chair.

Referring now to FIGS. 1 and 2, an object 20, such as a chair 22 is covered by a form-shapable tarpaulin material 10 that is formed about the chair to create formed shape 18. The form-shapable tarpaulin material comprises a planar sheet of material 30 having a malleable component 50 that is configured to be deformed into a formed shape and will retain that shape. The formed shape may include bends or folds and the formed shape may be formed to ensure that precipitation or rain does not collect on the formed shape. As shown, the area above the seat 23 of the chair is sloped from the back 25 of the chair to the front of the seat of the chair to ensure that water does not puddle on the form-shapable tarpaulin material.

Figure 3:
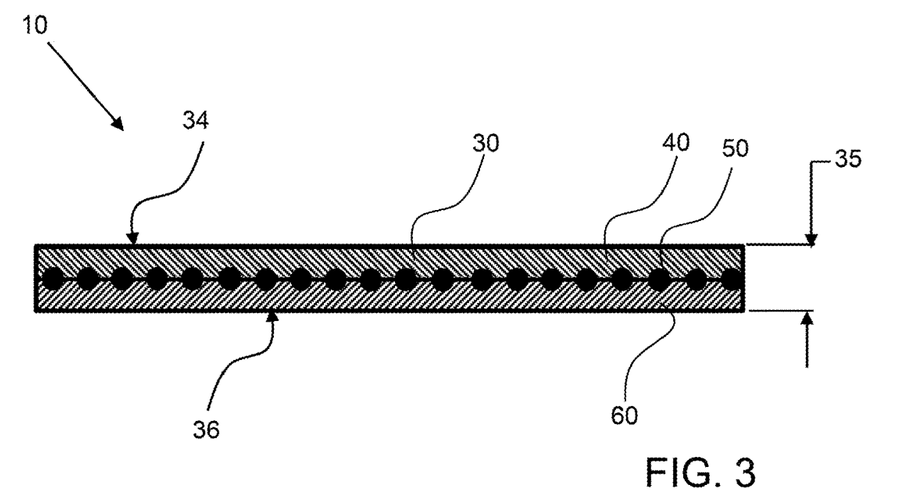
FIG. 3 shows a cross-sectional view of an exemplary form-shapable tarpaulin material having a first surface layer on a first surface, a second surface layer on a second surface opposing said first surface and a malleable component configured between the first and second surface layers.
Figure 4:
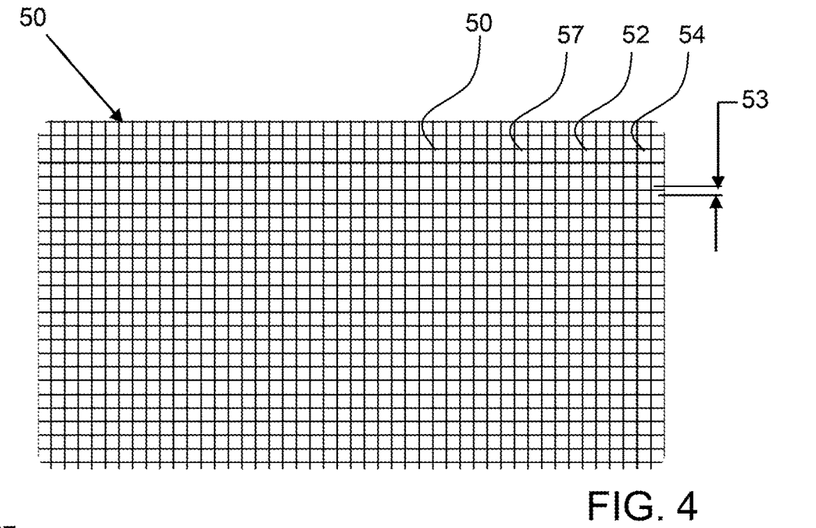
FIG. 4 shows a top view of an exemplary malleable component comprising a plurality of strands formed into a screen having apertures between the strands.
Figure 5:
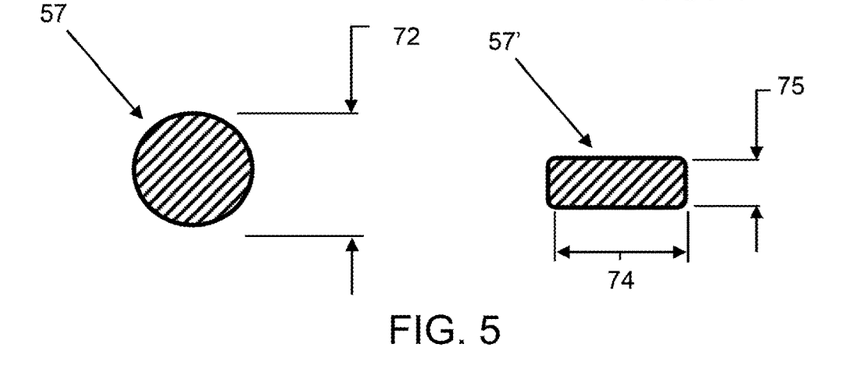
FIG. 5 shows cross-sectional view of exemplary malleable component strands.

Referring now to FIGS. 3 to 5, an exemplary form-shapable tarpaulin material 10 includes a planar sheet of material 30 that has a first surface layer 40 on a first surface 34, a second surface layer 60 on a second surface 36, opposing said first surface and a malleable component 50 configured between the first and second surface layers. The malleable component 50 may comprises a plurality of strands 57 formed into a screen 54 having apertures 52 between the strands, as shown in FIG. 4. A strand 57, as shown in FIG. 5, may have a curved or circular cross-sectional shape with a strand diameter 72 or a stand may be a polygonal strand 57', being polygonal in shape having a plurality of planar sides with a stand width 74 and strand thickness 75. The malleable component 50 may have apertures 52 and an aperture width 53 between the strands. The planar sheet of material 30 has a thickness 35.

Figure 6:
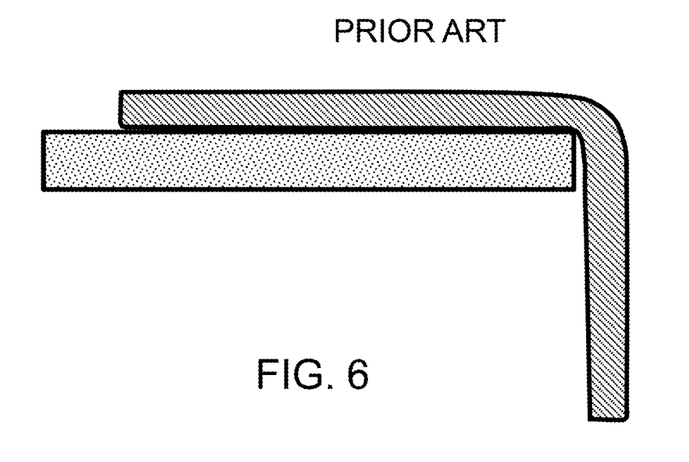
FIG. 6 shows a drape test for a conventional tarp material that is supple and readily drapes having a drape angle of at least 75 degrees, as described herein.
Figure 7:
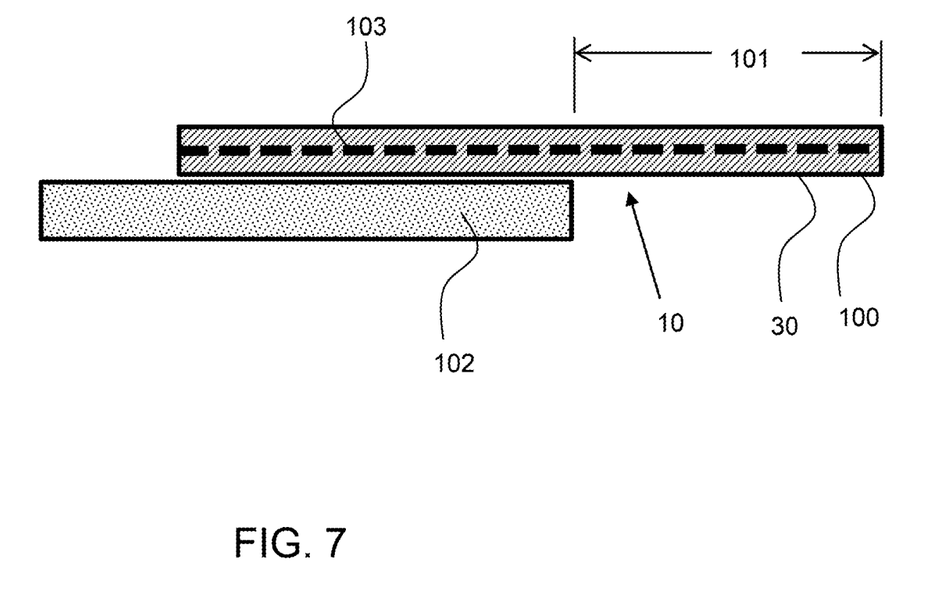
FIG. 7 shows a drape test for an exemplary form-shapable tarpaulin material wherein the drape angle is no more than 20 degrees.
Figure 8:
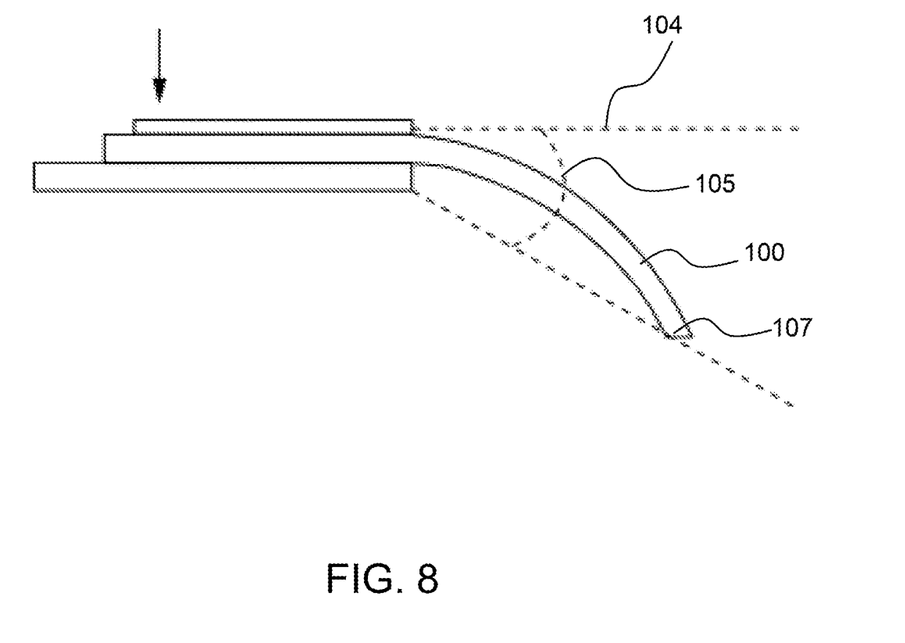
FIG. 8 shows a drape test schematic indicating the drape angle extending down from a horizontal axis to the extended end of the projected material.

Referring now to FIGS. 6 to 8, a drape test is a common and straight forward way to measure the stiffness of a fabric or material. As shown in FIG. 6, a conventional tarp material is supple and readily drapes having a drape angle of at least 75 degrees, as described herein. As shown in FIG. 7, an exemplary form-shapable tarpaulin material 10 or planar sheet of material 30 of the form-shapable tarpaulin material 10 is stiff and has a drape angle of no more than 20 degrees. As shown in FIG. 8, the drape angle 105 extends down from a horizontal axis 104 to the extended end 107 of the projected material 100. For the purposes of measuring drape angle, the projected material 100 has a length 101, as shown in FIG. 7 of 100 mm and for the material to be considered stiff according to the present invention, the drape angle under these parameters can be no more than 25 degrees and may be 15 degrees or less or even 10 degrees or less. A lower drape angle means the material is stiffer and therefore may retain a formed shape more effectively. The test specimen for the drape test may have a width, orthogonal to the projected direction, that is 100 mm.

Figure 9:
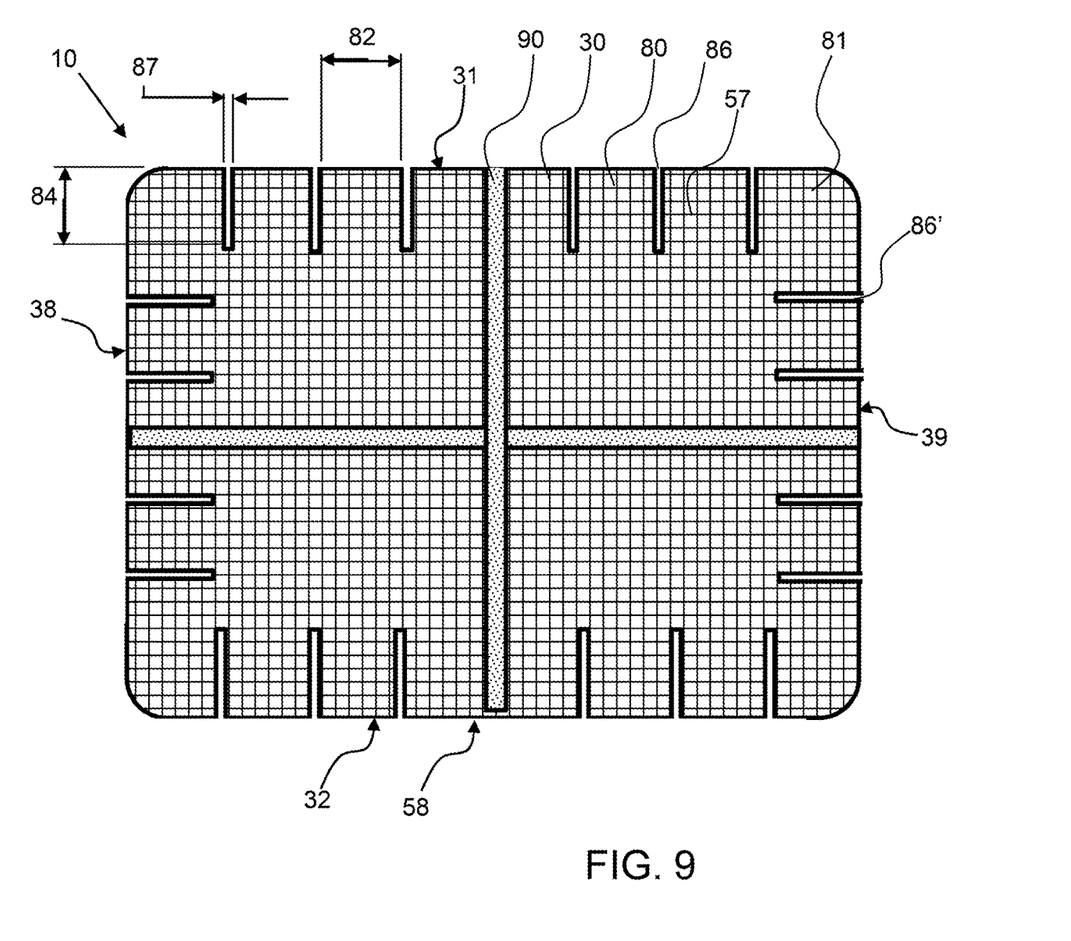
FIG. 9 show a first surface view of an exemplary form-shapable tarpaulin material having a plurality of anchor tabs on the first side, second side, first end side and second end side, as well as a fold portion that is void of the malleable component to allow folding of the form-shapable tarpaulin material.

As shown in FIG. 9, an exemplary form-shapable tarpaulin material 10 has a planar sheet of material 30 and a plurality of anchor tabs 80 on the first side 31, second side 32, first end side 38 and second end side 39, as well as a fold portion 90 that is void of the malleable component 50 to allow folding of the form-shapable tarpaulin material. Also, corner anchor tabs 81 are formed by the tab gaps 86, 86' between adjacent anchor tabs on adjacent sides. The anchor tab width 82 is shown and may be consistent across a side or may be different from one anchor tab to another. The anchor tab depth 84, the distance into the form-shapable tarpaulin material from the side, is also shown and this may be about the same dimension as the tab width or greater. There may be a gap between adjacent tabs having a tab gap width 87, that may be very small, such as no more than about 5 mm, for example. It should be noted that the strands 57 are shown in a grid buy may extend in only one direction, wherein the strands are parallel to each other and extend from the first side to the second side or alternatively from the first-end side to the second-end side. Also, a perimeter strand 58 may extend around the perimeter of the form-shapable tarpaulin material and may extend in along the tab gaps to provide additional rigidity to the anchor tabs. The perimeter strand may be different in cross-sectional shape and weight from the strands extending along or across the sheet of material 30.

Figure 10:
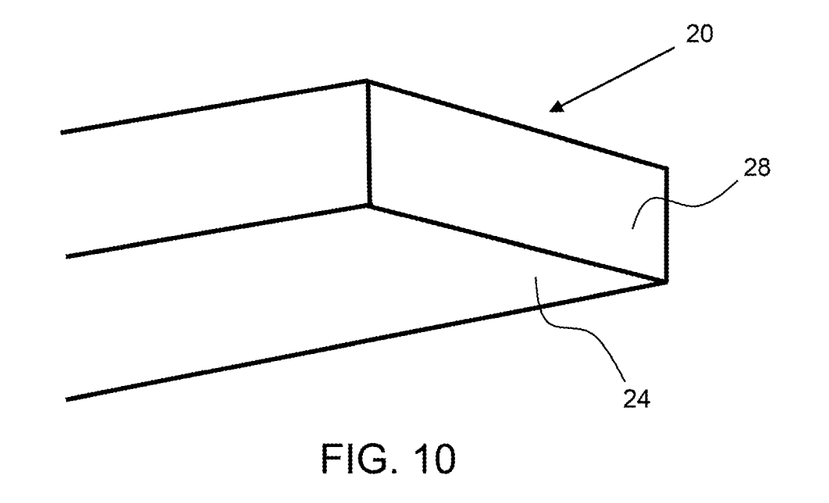
FIG. 10 shows a perspective view of an object to be covered having an overhang or underside surface.
Figure 11:
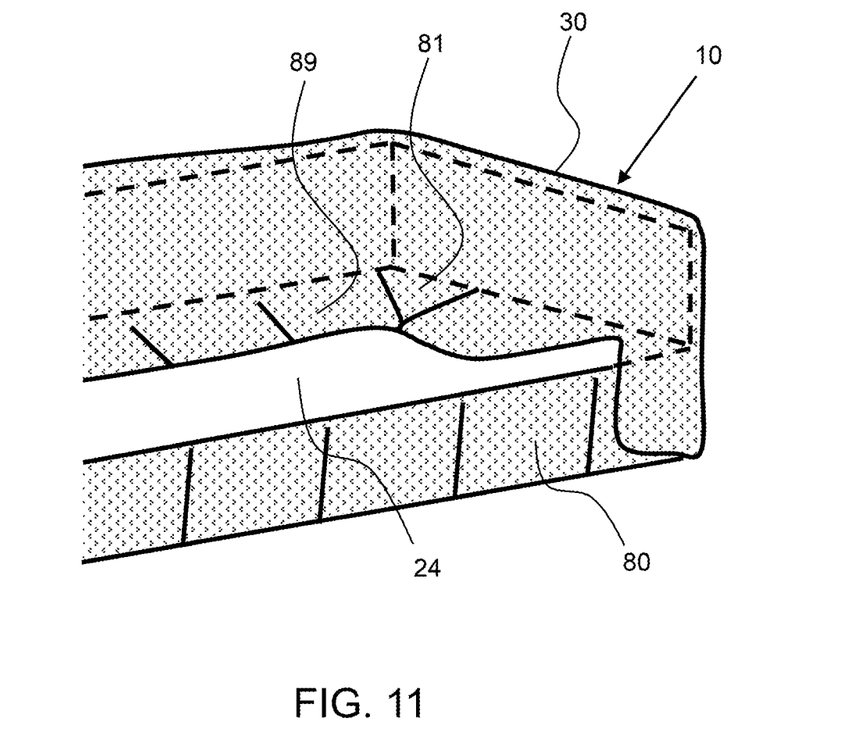
FIG. 11 shows an exemplary form-shapable tarpaulin material configured over the object shown in FIG. 10 with the anchor tabs folded under the underside to retain the form-shapable tarpaulin material on the object to be covered.

Referring now to FIGS. 10 and 11, an object 20 to be covered has an overhang or underside surface 24, as shown in FIG. 10. The underside is a surface, such as a planar surface that extends underneath of a portion of an object with respect to vertical. A table when standing vertically with a horizontal table top has a top surface and an opposing underside of the table top, for example. An exemplary form-shapable tarpaulin material 10 is configured over the object 20 with the anchor tabs 80 folded under the underside surface 24 to retain the form-shapable tarpaulin material 10 on the object to be covered, as shown in FIG. 11. Note that a corner anchor tab 81 is folded and additional anchor tabs 80 hold the corner tab in place. The anchor tabs may extend along the underside and may be substantially orthogonal (within 15 degrees of orthogonal) to a side surface 28 of the object to be covered. The anchor tabs are configured to retain this folded shape to retain the form-shapable tarpaulin material over the object.

Figure 12:
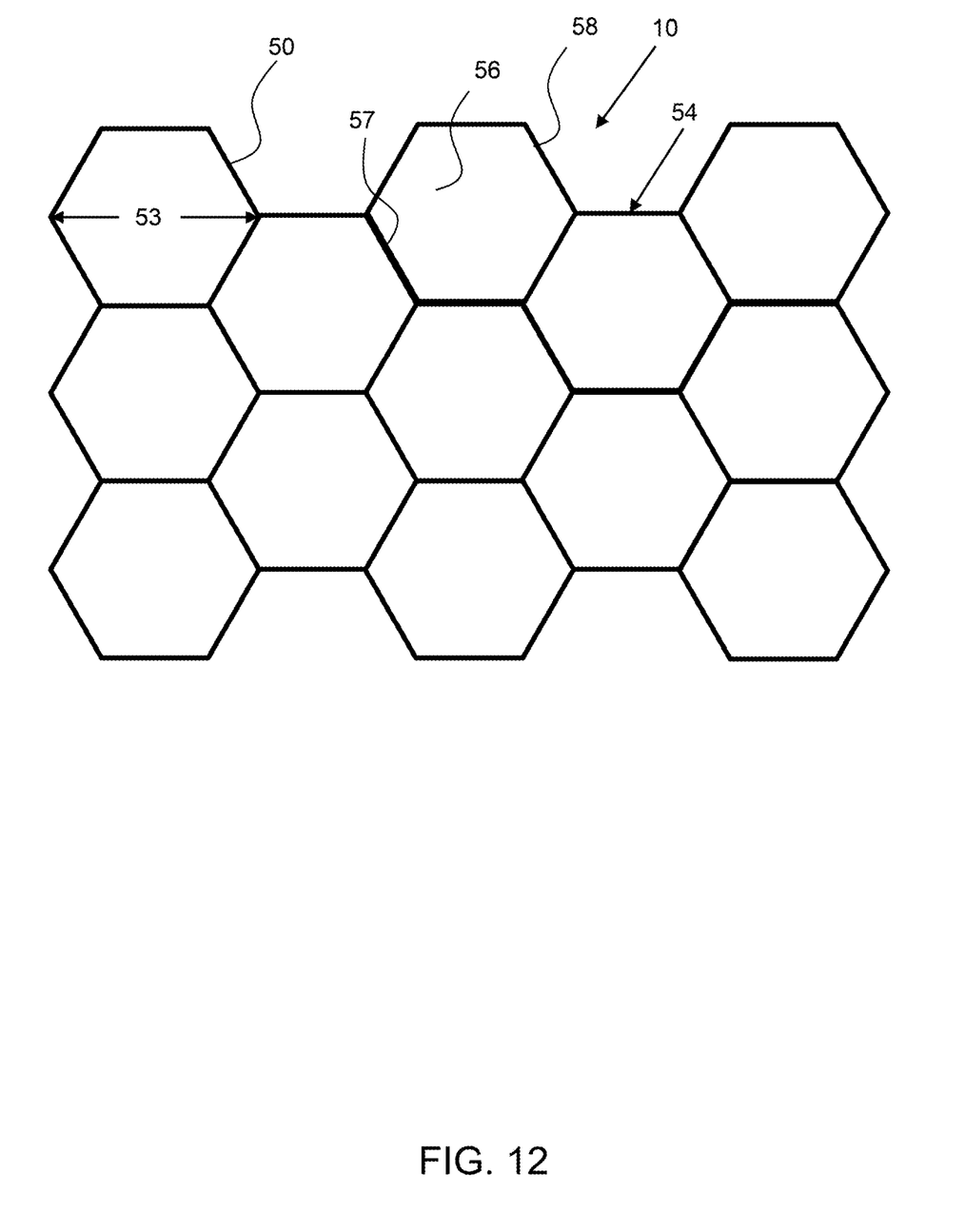
FIG. 12 shows a top view of an exemplary malleable component having hexagonal cell shapes.

As shown in FIG. 12 a malleable component 50 has cells 56 with a cell width or aperture width 53, the largest dimension across the cell, that is the substantially the same, within 20% of the same value, from cell to cell. The malleable component may be referred to as a screen 54, wherein the percent open area is more than 70%. The cells 56 of this screen 54 are polygonal in shape, hexagons, wherein the strands 57 extend between adjacent cells. The cells have linear sides formed by the strands. This polygonal shape may enable formation of curved formed shapes as there are many planes along which to bend the malleable component. As described herein this malleable component may comprises a coating 58, and the coating may substantially cover the surface of the malleable component or the screen, as described herein.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A method of covering an object comprising:
    a) providing an object to be covered;
    b) providing a sheet of a form-shapable tarpaulin material comprising:
        a first side;
        a second side;
        a first side layer;
        a malleable component coupled to the first side layer;
        wherein the form-shapable tarpaulin material is configured for deformation into a formed shape and configured to hold said formed shape;
    wherein the form-shapable tarpaulin material has a drape angle of no more than 25 degrees with a length of projected material of 100 mm
    c) bending the form-shapable tarpaulin material over said object to create a formed shape having a shaped form;
    wherein the form-shapable tarpaulin material holds said shaped form.

2. The method of claim 1, wherein the malleable component is a sheet of metal.

3. The method of claim 1, wherein the malleable component is sheet of formable plastic.

4. The method of claim 1, wherein the malleable component is a discontinuous layer having apertures therethrough.

5. The method of claim 4, wherein the apertures have a width of no more than 50 mm.

6. The method of claim 5, wherein the malleable component has an open area of at least 50%.

7. The method of claim 6, wherein the malleable component is a metal screen.

8. The method of claim 7, wherein the metal screen forms a plurality of cells coupled together.

9. The method of claim 8, wherein the cells are polygonal in shape.

10. The method of claim 9, wherein the cells are hexagons.

11. The method of claim 4, wherein the malleable component is a metal net.

12. The method of claim 4, wherein the malleable component comprises strands having a circular cross-section with a diameter of no more than 3 mm.

13. The method of claim 4, wherein the malleable component comprises strands having a rectangular cross-section with a width of no more than 2 mm.

14. The method of claim 1, wherein the malleable component has a weight/area between 150 g/m2 to 600 g/m$^2$.

15. The method of claim 1, wherein the first side layer is a plastic sheet.

16. The method of claim 1, wherein the first side layer is a continuous layer.

17. The method of claim 1, wherein the first side layer is water proof.

18. The method of claim 1, further comprising a second side layer and wherein the malleable component is configured between the first side layer and the second side layer.

19. The method of claim 18, wherein the first side layer and the second side layer are plastic.

20. The method of claim 18, wherein the first side layer and the second side layer are continuous layers.

21. The method of claim 1, wherein the sheet of material further comprises anchor tabs configured along a perimeter of the sheet of material and wherein the method further comprises bending the anchor tabs around a portion of the object.

22. The method of claim 21, wherein the sheet of material is rectangular having a first side, a second side, a first-end side and a second-end side, wherein at least two of said sides comprise an anchor tab; and     wherein at least one of said anchor tabs is bent orthogonally from the planar sheet of material and hold a bent shape around said object.

23. The method of claim 22, wherein each of the first side, the second side, the first-end side and the second-end side each comprise an anchor tab.

24. The method of claim 23, wherein the anchor tabs extend in at least 4 cm from one of said sides of the sheet of material.

25. The method of claim 24, wherein the anchor has a width of at least 4 cm.

26. The method of claim 24, wherein the anchor tabs extend in at least 10 cm from one of said sides of the sheet of material.

27. The method of claim 21, wherein the object has an underside and wherein an anchor tab of said anchor tabs is folded to extend along said underside of the object.

\* \* \* \* \*